US 6,466,280 B1

(12) United States Patent
Park et al.

(10) Patent No.: US 6,466,280 B1
(45) Date of Patent: Oct. 15, 2002

(54) TRANSFLECTIVE LIQUID CRYSTAL DISPLAY DEVICE AND METHOD OF MANUFACTURING THE SAME

(75) Inventors: Sung-Il Park, Kyonggi-do; Jae-Young Chung, Pusan, both of (KR)

(73) Assignee: LG. Philips LCD Co., Ltd., Seoul (KR)

( * ) Notice: Subject to any disclaimer, the term of this patent is extended or adjusted under 35 U.S.C. 154(b) by 16 days.

(21) Appl. No.: 09/633,781

(22) Filed: Aug. 7, 2000

(30) Foreign Application Priority Data

Aug. 6, 1999 (KR) ........................................ 1999-32260

(51) Int. Cl.[7] ..................... G02F 1/1335; G02F 1/1343; G02F 1/1368
(52) U.S. Cl. ........................ 349/43; 349/114; 349/113; 349/138; 349/139
(58) Field of Search .......................... 349/92, 113, 114, 349/111, 42, 43, 57, 72, 138, 139

(56) References Cited

U.S. PATENT DOCUMENTS

| 5,543,946 | A | * | 8/1996 | Enomoto et al. | 359/87 |
| 6,215,538 | B1 | * | 4/2001 | Narutaki et al. | 349/106 |
| 6,281,952 | B1 | * | 8/2001 | Okmamoto et al. | 349/12 |
| 6,330,047 | B1 | * | 12/2001 | Kubo et al. | 347/147 |

FOREIGN PATENT DOCUMENTS

JP 409179140 * 8/1999

* cited by examiner

Primary Examiner—William L. Sikes
Assistant Examiner—Hoan C. Nguyen
(74) Attorney, Agent, or Firm—Birch, Stewart, Kolasch & Birch, LLP

(57) ABSTRACT

The present invention discloses A transflective liquid crystal display device including a first substrate having a color filter; a second substrate having: a)a gate electrode formed on the second substrate; b) a first insulating layer formed on the exposed surface of the second substrate while covering the gate electrode; c) a semiconductor layer formed on the first insulating layer and over the gate electrode; d)a source electrode overlapping one end portion of the semiconductor layer; e) a drain electrode overlapping the other end portion of the semiconductor layer and spaced apart from the source electrode; f) a second insulating layer formed on the exposed surface of the first insulating layer while covering the source and drain electrode, having a first contact hole formed on a portion of the drain electrode; g) a pixel electrode formed on the second insulating layer and electrically connected with the drain electrode through the first contact hole; h) a third insulating layer on the pixel electrode and having a second contact hole over the first contact hole; and i) a reflective electrode formed on the third insulating layer and having a light transmitting hole and electrically connected with the pixel electrode through the second contact hole, the light transmitting hole transmitting light and covered by the pixel electrode; a liquid crystal display layer interposed between the first and second substrates; and a back light device for supplying light and located under the second substrate.

14 Claims, 5 Drawing Sheets

TRANSFLECTIVE LIQUID CRYSTAL DISPLAY DEVICE AND METHOD OF MANUFACTURING THE SAME

CROSS REFERENCE

This application claims the benefit of Korean Patent Application No. 1999-32260, filed on Aug. 6, 1999, under 35 U.S.C. §119, the entirety of which is hereby incorporated by reference.

BACKGROUND OF THE INVENTION

1. Field of the Invention

The present invention relates to a liquid crystal display (LCD) device, and more particularly, to a transfiective LCD device and a method of manufacturing the same.

2. Description of Related Art

In general, LCDs are divided into transmissive LCD devices and reflective LCD devices according to whether the display uses an internal or an outer light source.

A typical transmissive LCD device comprises a liquid crystal panel and a back light device. The liquid crystal panel includes upper and lower substrates with a liquid crystal layer interposed therebetween. The upper substrate has a color filter, and the lower substrate has a thin film transistor (TFT) as a switching element. An upper polarizer is arranged on the upper substrate of the liquid crystal panel, and a lower polarizer is arranged between the lower substrate of the liquid crystal panel and the backlight device.

At this time, the two polarizers have a transmittance of 45%, the two substrates have a transmittance of 94%, the TFT array and the pixel have a transmittance of 65%, and the color filter has a transmittance of 27%, respectively. Therefore, the transmissive LCD device gets to have about a transmittance of 7.4% as seen in FIG. 1 which shows a transmittance respectively measured after light passes through each layers. For such a reason, the transmissive LCD device requires a high brightness of the back light device, and thus an electric power consumption by the backlight device increases. In order to supply a sufficient power to the backlight device, a relatively heavy battery is employed, however, there still exists a problem that the battery can not be used for a long time.

In order to overcome the problem described above, the reflective LCD has been developed.

FIG. 2 is a plan view illustrating a typical reflective LCD device. As shown in FIG. 2, the reflective LCD device 100 includes gate lines 6 and 8 arranged in a transverse direction, data lines 2 and 4 arranged in a longitudinal direction perpendicular to the gate lines 6 and 8, and thin film transistors(TFTs), for example, the thin film transistor "S" near a cross point of the gate line 8 and the data line 2. Each of the TFTs "S" has a gate electrode 18, a source electrode 12 and a drain electrode 14. The gate electrode 18 extends from the data line 2, and the gate electrode 18 extends from the gate line 8. The reflective LCD device 100 further includes reflective electrodes 10. The reflective electrode 10 is electrically connected with the drain electrode 14 through a contact hole 16 and is made of a metal having a good reflectance.

FIG. 3 is a cross sectional view taken along the line ▢—▢ of FIG. 2. As shown in FIG. 3, the gate electrode 18 is formed on the substrate 1, and a gate insulating layer 20 is formed on the exposed surface of the substrate 1 while covering the gate electrode 18. A semiconductor layer 22 as an active area of the TFT "S" is formed over the gate electrode 18. The source and drain electrodes 12 and 14 are spaced apart from each other. The source electrode 12 overlaps one end portion of the semiconductor layer 22, and the drain electrode 14 overlaps the other end portion of the semiconductor layer 22. A passivation film 24 is formed over the whole surface of the substrate 1 while covering the TFT "S". The passivation film 24 has the contact hole 16 on the predetermined portion of the drain electrode 14. The reflective electrode 10 is formed on the passivation film 24 and is electrically connected with the drain electrode 14 through the contact hole 16.

Since the reflective LCD device uses ambient light, it is easy to carry. Also, the reflective LCD device is superior in aperture ratio to the transmissive LCD device. By the way, the reflective LCD device has a problem that it is affected by its surroundings. For example, the brightness of ambient light in an office differs largely from that of the outdoors. Also, even in the same location, the brightness of ambient light depends on the time of day (e.g., noon or dusk). Therefore, the reflective LCD device can not be used at night without ambient light.

For the foregoing reasons, there is a need for a transflective LCD device that can be used on the time of day as well as night.

SUMMARY OF THE INVENTION

To overcome the problems described above, preferred embodiments of the present invention provide a transflective LCD device manufactured by a simplified process.

In order to achieve the above object, the preferred embodiment of the present invention provides a trasflective liquid crystal display device including a first substrate having a color filter; a second substrate having: a) a gate electrode formed on the second substrate; b) a first insulating layer formed on the exposed surface of the second substrate while covering the gate electrode; c) a semiconductor layer formed on the first insulating layer and over the gate electrode; d) a source electrode overlapping one end portion of the semiconductor layer; e) a drain electrode overlapping the other end portion of the semiconductor layer and spaced apart from the source electrode; f) a second insulating layer formed on the exposed surface of the first insulating layer while covering the source and drain electrode, having a first contact hole formed on a portion of the drain electrode; g) a pixel electrode formed on the second insulating layer and electrically connected with the drain electrode through the first contact hole; h) a third insulating layer on the pixel electrode and having a second contact hole over the first contact hole; and i) a reflective electrode formed on the third insulating layer and having a light transmitting hole and electrically connected with the pixel electrode through the second contact hole, the light transmitting hole transmitting light and covered by the pixel electrode; a liquid crystal display layer interposed between the first and second substrates; and a back light device for supplying light and located under the second substrate.

In another aspect, the preferred embodiment of the present invention a trasflective liquid crystal display device including: a first substrate having a color filter; a second substrate having: a) a gate electrode formed on the second substrate; b) a first insulating layer formed on the exposed surface of the second substrate while covering the gate electrode; c) a semiconductor layer formed on the first insulating layer and over the gate electrode; d) a source electrode overlapping one end portion of the semiconductor layer; e) a drain electrode overlapping the other end portion of the semiconductor layer and spaced apart from the source electrode; f) a second insulating layer formed the exposed surface of the first insulating layer while covering the source and drain electrode, having a first contact hole formed on a portion of the drain electrode; g) a reflective electrode formed on the second insulating layer and electrically connected with the drain electrode through the first contact hole and having a light transmitting hole, the light transmitting hole transmitting light; h) a third insulating layer on the reflective electrode and having a second contact hole over the first contact hole; and i) a pixel electrode formed on the third insulating layer and electrically connected with the reflective electrode through the second contact hole and having a sufficient size to cover the light transmitting hole; a liquid crystal display layer interposed between the first and second substrates; and a back light device for supplying light and located under the second substrate.

The reflective electrode is made of an opaque metal, and the pixel electrode is made of a transparent conductive material such as indium tin oxide and indium zinc oxide. The first and third insulating layers are made of one of SiNx and SiOx. The second insulating layer is made of benzocyclobutene (BCB). The light transmitting hole is formed on the central portion of the reflective electrode, or The reflective electrode is formed in the form of an island so that the reflective electrode is surrounded by the transmitting hole. The transflective liquid crystal display device further includes upper and lower polarizers. The upper polarizer is arranged over the first substrate, and the lower polarizer is arranged between the second substrate and the backlight device.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFFERED EMBODIMENTS

Reference will now be made in detail to the preferred embodiment of the present invention, example of which is illustrated in the accompanying drawings.

Figure 1:
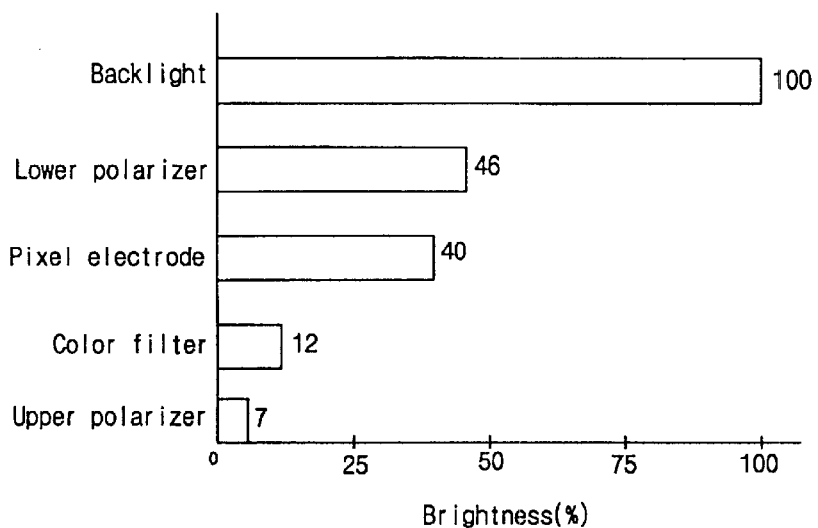
FIG. 1 is a graph illustrating a transmittance respectively measured after light passes through each layers of a conventional liquid crystal display device.
Figure 2:
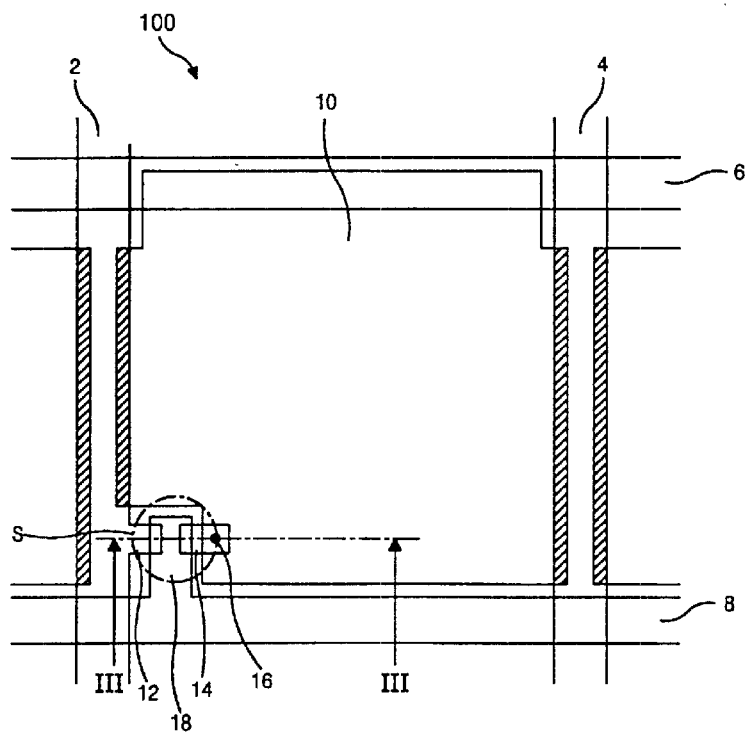
FIG. 2 is a plan view illustrating a conventional reflective liquid crystal display device.
Figure 3:
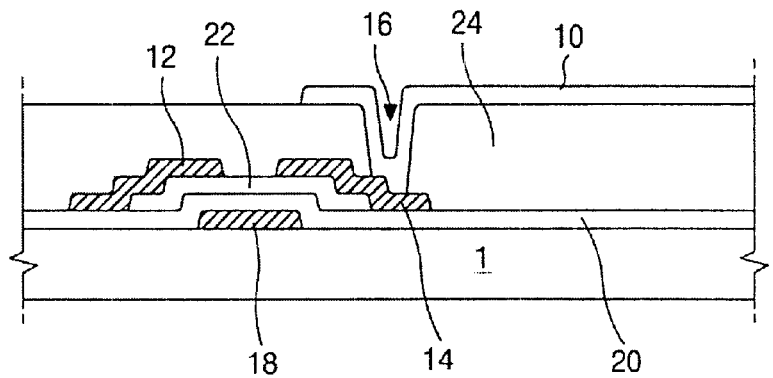
FIG. 3 is a cross sectional view taken along the line □—□ of FIG. 2, illustrating the conventional reflective liquid crystal display device.
Figure 4:
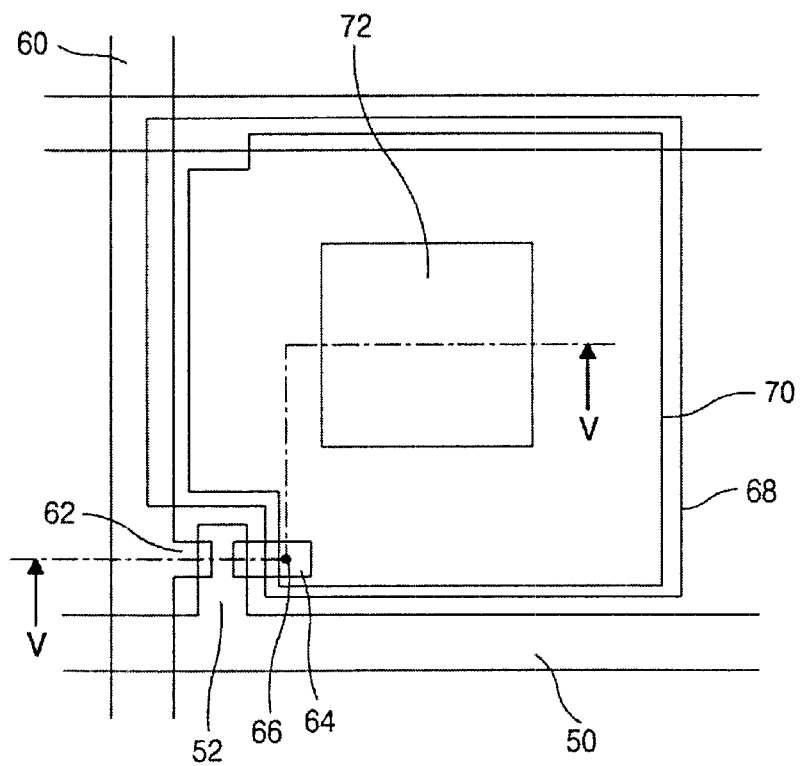
FIG. 4 is a plan view illustrating an array substrate of a transflective liquid crystal display device according to a preferred embodiment of the present invention.

FIG. 4 is a plan view illustrating an array substrate of a transflective liquid crystal display (LCD) device according to a preferred embodiment of the present invention. As shown in FIG. 4, the array substrate includes gate line 50 arranged in a transverse direction, data line 60 arranged in a longitudinal direction perpendicular to the gate line 50, and a thin film transistor (TFT) arranged near the cross portion of the gate and data lines 50 and 60. The TFT has a gate electrode 52, a source electrode 62 and a drain electrode 64. The gate electrode 52 extends from the gate line 50, and the source electrode 62 extends from the data line 60. The array substrate further includes a reflective electrode 68 and a pixel electrode 70, which are formed on a region defined by the gate and data lines S0 and 60. The reflective electrode 68 and the pixel electrode 70 are electrically connected with the drain electrode 64 through a contact hole 66. The reflective electrode 68 is made of an opaque conductive metal, and the pixel electrode 70 is made of a transparent conductive material. The reflective electrode 68 has a light transmitting hole 72 formed on a central portion thereof. The light transmitting hole 72 serves to transmit light and has a substantially rectangular shape. The pixel electrode 70 has a sufficient size to cover the light transmitting hole 72. In other words, the pixel electrode 70 covers the light transmitting hole 72.

Figure 5A:
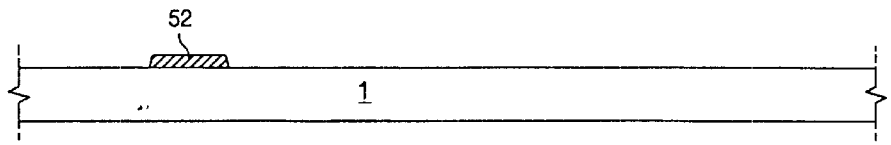
FIGS. 5A to 5D are cross sectional views taken along the line □—□ of FIG. 4, illustrating a process for manufacturing the array substrate of the transflective liquid crystal display device according to the preferred embodiment of the present invention.
Figure 5B:
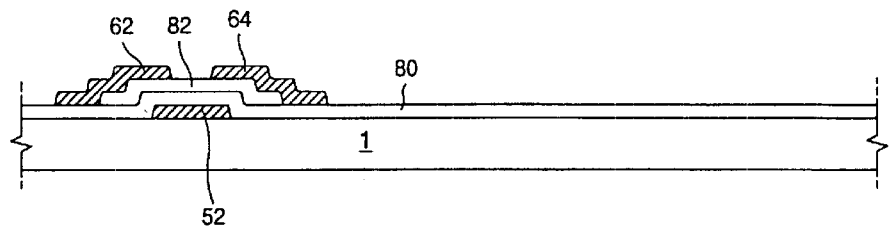
Figure 5C:
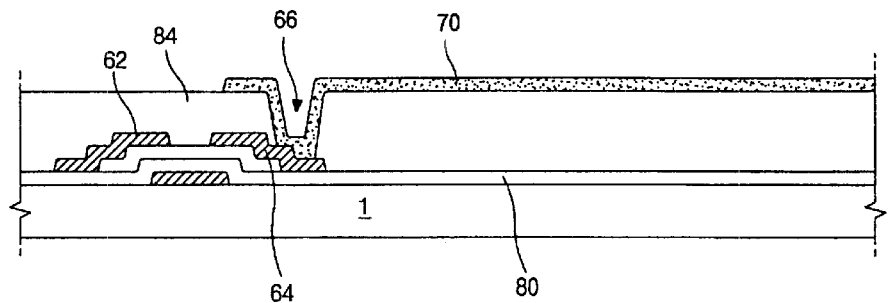
Figure 5D:
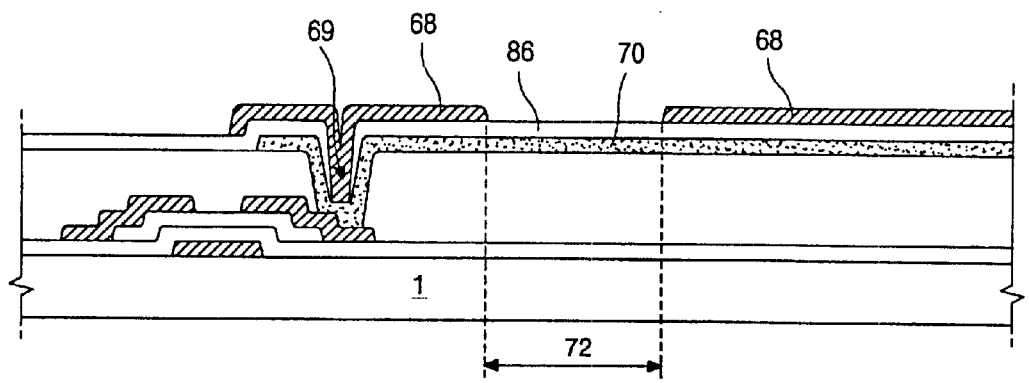
Figure 5E:
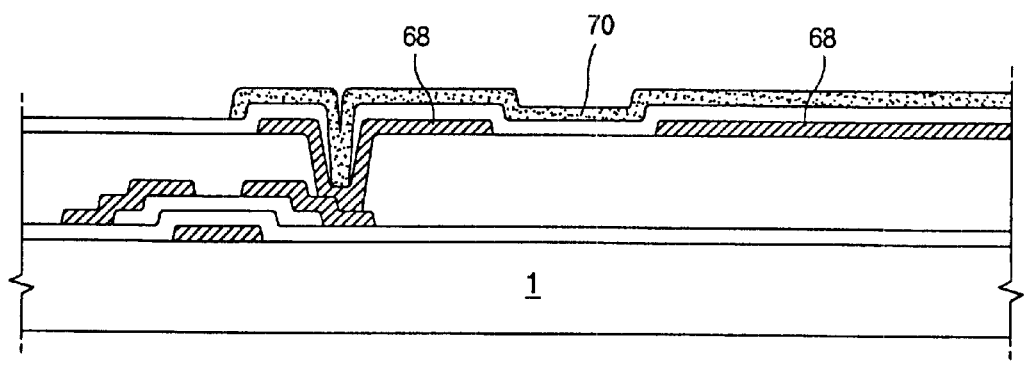

FIGS. 5A to 5D are cross sectional views taken along the line □—□ of FIG. 4, illustrating a process of manufacturing the array substrate of the transflective LCD device according to the preferred embodiment of the present invention. First, as shown in FIG. 5A, a first metal layer is deposited on a substrate 1 and patterned into the gate electrode 52. The first metal layer is made of a metal having a high corrosion resistance such as chrome, tungsten and aluminum alloy. Then, as shown in FIG. 5B, a gate insulating layer 80, a semiconductor layer 82 and the source and drain electrodes 62 and 64 are sequentially formed. The gate insulating layer 80 is formed on the exposed surface of the substrate 1 while covering the gate electrode 52. The semiconductor layer 82 is formed on the gate insulating layer 80 and over the gate electrode 52. The source electrode 62 overlaps one end portion of the semiconductor layer 82, and the drain electrode 64 overlaps the other end portion of the semiconductor layer 82. The source and drain electrodes 62 and 64 are spaced apart from each other. Sequentially, as shown in FIG. 5C, a passivation film 84 is formed on the exposed surface of the gate insulating layer 80 while covering the source and drain electrodes 62 and 64. A portion of the passivation film 84 on the drain electrode 54 is etched to form a first contact hole 66. The passivation film 84 is made of an insulating material having a good moisture resistance and a good transmittance and preferably benzocyclobutene (BCB). Next, the pixel electrode 70 is formed on the passivation film 84 and is electrically connected with the drain electrode 64 through the first contact hole 66. The pixel electrode 70 is made of a transparent conductive metal having a good transmittance and preferably one of indium tin oxide (ITO) and indium zinc oxide (IZO). After that, as shown in FIG. 5D, an inter-layer insulating film 86 is formed over the whole surface of the substrate 1 while covering the pixel electrode 70. The inter-layer insulating film 86 is made of made of one of silicon nitride (SiNx) and silicon oxide (SiOx). A portion of the inter-layer insulating film 86 over the first contact hole 66 is exposed to form a second contact hole 69. Then, the reflective electrode 68 is formed on the inter-layer insulating film 86 and is electrically connected with the pixel electrode 70. A portion of the reflective electrode 68 is etched form the light transmitting hole 72. A size and shape of the light transmitting hole 72 is not limited. Further, the reflective electrode 68 may be formed in the form of an island and thus be surrounded by the transmitting hole 72. At this point, the inter-layer insulating film 86 serves to prevent the over-etching during forming the light transmitting hole 72, so that a possible line open of the pixel electrode can be prevented.

Figure 6:
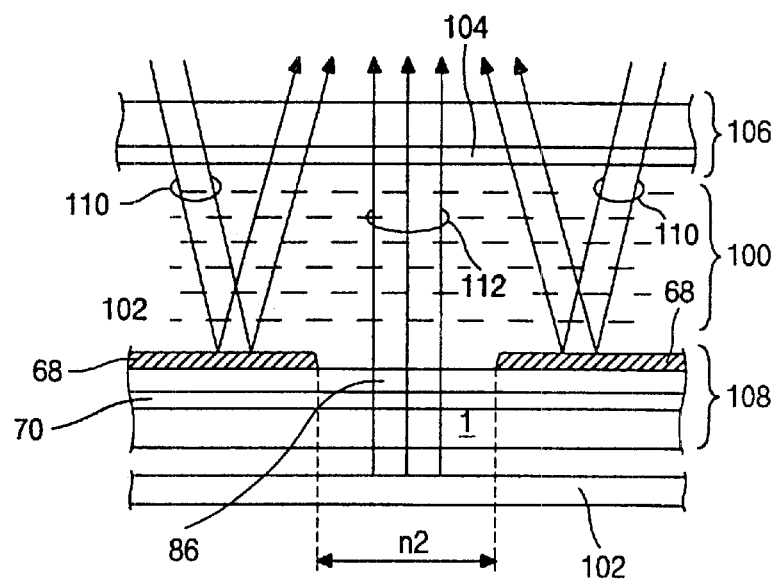
FIG. 6 is a cross sectional view illustrating a modification of the array substrate of the transflective liquid crystal display device according to the preferred embodiment of the present invention.

In the mean while, as shown in FIG. 6, the pixel electrode may be formed over the reflective electrode 68 with the inter-layer insulating film 84 interposed therebetween.

Figure 7:
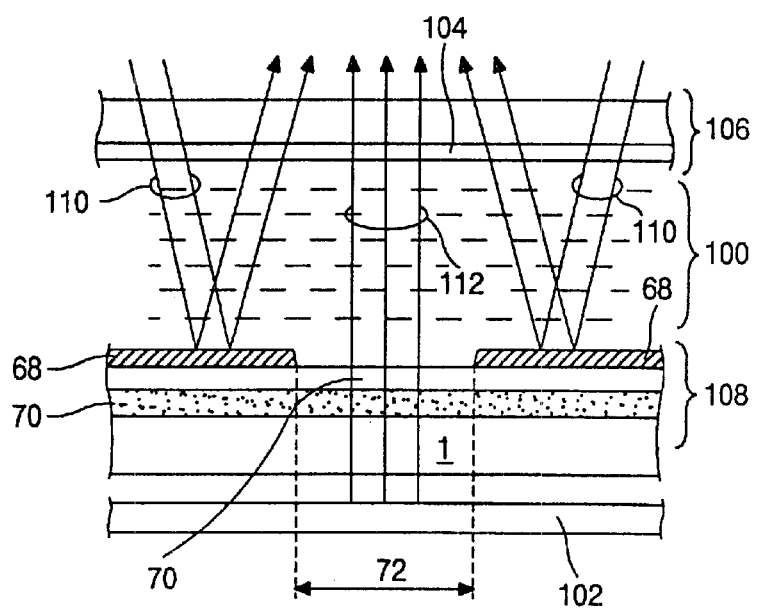
FIG. 7 is a cross sectional view illustrating the transflective liquid crystal display device according to the preferred embodiment of the present invention.

FIG. 7 is a cross-sectional view illustrating the transflective LCD device according to the preferred embodiment of the present invention. As shown in FIG. 9, the trnasflective LCD device includes a liquid crystal panel and a backlight device 102. The liquid crystal display panel includes lower and upper substrates 106 and 108 with a liquid crystal layer 100 interposed therebetween. The upper substrate 106 has a color filter 104, and the lower substrate 108 as the array substrate has the TFT, the pixel electrode 70 and the reflective electrode 68. The reflective electrode 68 includes the light transmitting hole 72 formed therein. The pixel electrode 70 covers a region corresponding to the light transmitting hole 72. The trnasflective LCD device further includes an upper polarizer (not shown) on the upper substrate 106 and a lower polarizer (not shown) located between the lower substrate 108 and the backlight device 102.

The transfiective LCD device according to the preferred embodiment of the present invention is operated as follows.

First, in the reflective mode, the incident light 110 from the outside is reflected on the reflective electrode 68 and directs toward the upper substrate 106 again. At this time, when the electrical signals are applied to the reflective electrode 68 by the switching element (not shown), phase of the liquid crystal layer 100 varies and thus the reflected light of the incident light 110 is colored by the color filter 104 and displayed in the form of colored light.

In the transmissive mode, light 112 emitted from the backlight device 72 passes through the transmitting holes 72. At this time, when the electrical signals are applied to the pixel electrode 70 by the switching element (not shown), phase of the liquid crystal layer 100 varies. Thus, the light 112 passing through the liquid crystal layer 100 is colored by the color filter 104 and displayed in the form of images with other colored lights.

As described herein before, according to the preferred embodiment of the present invention, the transflective LCD device that can be used on the time of both day and night is manufactured. Further, since the transflective LCD device can be manufactured by the simplified process, the production yield can be improved. Besides, since the inter-layer insulating film is formed between the reflective electrode and the pixel electrode, it is prevented to over-etch the pixel electrode during forming the light transmitting hole, whereupon the possible line open of the pixel electrode can be prevented.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A transflective liquid crystal display device comprising:
a first substrate having a color filter;
a second substrate having:
   a) a gate electrode formed on the second substrate;
   b) a first insulating layer formed on the exposed surface of the second substrate while covering the gate electrode;
   c) a semiconductor layer formed on the first insulating layer and over the gate electrode;
   d) a source electrode overlapping one end portion of the semiconductor layer;
   e) a drain electrode overlapping the other end portion of the semiconductor layer and spaced apart from the source electrode;
   f) a second insulating layer formed on the exposed surface of the first insulating layer while covering the source and drain electrode, having a first contact hole formed on a portion of the drain electrode;
   g) a pixel electrode formed on the second insulating layer and electrically connected with the drain electrode through the first contact hole;
   h) a third insulating layer on the pixel electrode and having a second contact hole over the first contact hole; and
   i) a reflective electrode formed on the third insulating layer and having a light transmitting hole and electrically connected with the pixel electrode through the second contact hole, the light transmitting hole transmitting light and covered by the pixel electrode;
a liquid crystal display layer interposed between the first and second substrates; and
a back light device for supplying light and located under the second substrate.

2. The transflective liquid crystal display device of claim 1, wherein the reflective electrode is made of an opaque conductive metal, and the pixel electrode is made of a transparent conductive material such as indium tin oxide and indium zinc oxide.

3. The transflective liquid crystal display device of claim 1, wherein the first and third insulating layer is made of one of SiNx and SiOx.

4. The transflective liquid crystal display device of claim 1, wherein the second insulating layer is made of benzocyclobutene (BCB).

5. The transflective liquid crystal display device of claim 1, wherein the light transmitting hole is formed on the central portion of the reflective electrode.

6. The transflective liquid crystal display device of claim 1, wherein the reflective electrode is formed in the form of an island so that the reflective electrode is surrounded by the transmitting hole.

7. The transflective liquid crystal display device of claim 1, further comprising, upper and lower polarizers, the upper polarizer arranged over the first substrate, the lower polarizer arranged between the second substrate and the backlight device.

8. A transflective liquid crystal display device comprising:
a first substrate having a color filter;
a second substrate having:
   a) a gate electrode formed on the second substrate;
   b) a first insulating layer formed on the exposed surface of the second substrate while covering the gate electrode;
   c) a semiconductor layer formed on the first insulating layer and over the gate electrode;
   d) a source electrode overlapping one end portion of the semiconductor layer;
   e) a drain electrode overlapping the other end portion of the semiconductor layer and spaced apart from the source electrode;
   f) a second insulating layer formed the exposed surface of the first insulating layer while covering the source and drain electrode, having a first contact hole formed on a portion of the drain electrode;

g) a reflective electrode formed on the second insulating layer and electrically connected with the drain electrode through the first contact hole and having a light transmitting hole, the light transmitting hole transmitting light;

h) a third insulating layer on the reflective electrode and having a second contact hole over the first contact hole; and i) a pixel electrode formed on the third insulating layer and electrically connected with the reflective electrode through the second contact hole and having a sufficient size to cover the light transmitting hole;

a liquid crystal display layer interposed between the first and second substrates; and a back light device for supplying light and located under the second substrate.

9. The transflective liquid crystal display device of claim 8, wherein the reflective electrode is made of an opaque metal, and the pixel electrode is made of a transparent conductive material such as indium tin oxide and indium zinc oxide.

10. The transflective liquid crystal display device of claim 8, wherein the first and third insulating layers are made of one of SiNx and SiOx.

11. The transflective liquid crystal display device of claim 8, wherein the second insulating layer is made of benzocyclobutene (BCB).

12. The transflective liquid crystal display device of claim 8, wherein the light transmitting hole is formed on the central portion of the reflective electrode.

13. The transflective liquid crystal display device of claim 8, wherein the reflective electrode is formed in the form of an island so that the reflective electrode is surrounded by the transmitting hole.

14. The transflective liquid crystal display device of claim 8, further comprising, upper and lower polarizers, the upper polarizer arranged over the first substrate, the lower polarizer arranged between the second substrate and the backlight device.

* * * * *